United States Patent
Felton et al.

(10) Patent No.: US 9,288,202 B1
(45) Date of Patent: Mar. 15, 2016

(54) PROXY PASSWORD RESET

(71) Applicant: Sprint Communications Company L.P., Overland Park, KS (US)

(72) Inventors: John D. Felton, Leawood, KS (US); Srilatha Marupaka, Overland Park, KS (US); Stefan Stroebel, Shawnee, KS (US); Jared W. Wonnacott, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 108 days.

(21) Appl. No.: 14/016,275

(22) Filed: Sep. 3, 2013

(51) Int. Cl.
*H04L 29/06* (2006.01)

(52) U.S. Cl.
CPC ................................ *H04L 63/083* (2013.01)

(58) Field of Classification Search
CPC .................................................. H04L 63/083
See application file for complete search history.

(56) References Cited

U.S. PATENT DOCUMENTS

2013/0276078 A1* 10/2013 Rockwell ............................ 726/7
2014/0298483 A1* 10/2014 Kato ........................ H04L 63/20
726/27

* cited by examiner

*Primary Examiner* — Aravind Moorthy
*Assistant Examiner* — Simon Kanaan

(57) ABSTRACT

A method for resetting a network password of a first user initiated by a second user is provided. The method comprises a system receiving a request from the second user to reset the password of the first user, wherein the first user is associated with the network. After receiving the request, verification that the second user has a hierarchal relationship to the first user, and that the second user has an active status in the network is completed. After the verification, the network password of the first user is then reset. A notification about resetting the network password is sent to a mobile communication device associated with the first user. Contact information of the second user is found in a data store based on an identification of the second user in the request; another notification is sent about resetting the network password to a communication account of the second user.

20 Claims, 8 Drawing Sheets

PROXY PASSWORD RESET

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A password is a secret word or a string of characters that is used for user authentication to prove identity, or for access approval to gain access to a resource. Passwords are used at many levels of the world to ensure security of information or resources. Sometimes, passwords are used to gain access into a computer system. The computer system may belong to a corporation, a university, a governmental organization, etc. In addition to a password, a computer system may use a user ID to differentiate people connected to a network. Sometimes, computer systems will authenticate passwords of people associated to a particular network with a user ID.

SUMMARY

In an embodiment, a method for resetting a network password of a first user initiated by a second user is disclosed. The method comprises a system receiving a request from the second user to reset the network password of the first user, wherein the network password of the first user is associated with a network. In response to receiving the request, verification that the second user has a hierarchal relationship to the first user, and that the second user has an active status in the network is completed. In response to the verification of the hierarchal relationship and the active status of the second user, the network password of the first user is then reset. A first notification about resetting the network password is sent to a mobile communication device wherein the mobile communication device is associated with the first user. Contact information of the second user is looked up in a data store based on an identification of the second user contained in the request; a second notification is sent about resetting the network password to a communication account of the second user based on the contact information of the second user.

In an embodiment, a method for resetting a network password of a first user initiated by a second user is disclosed. The method comprises a system receiving a request from the second user to reset the network password of the first user, wherein the network password of the first user is associated with a network, and wherein the request is in an email message. The source of the email message is verified as in the network to which the network password is associated. In response to receiving this request, verification that the second user has a hierarchical relationship to the first user and that the second user has an active status in the network is completed. In response to the verification of the source of the email message, the hierarchical relationship, and the active status of the second user, the network password is then reset. A first notification about resetting the network password is sent to a mobile communication device, wherein the mobile communication device is associated with the first user. Contact information of the second user is looked up in a data store based on an identification of the second user contained in the request; a second notification about resetting the network password is sent to a communication account of the second user based on the contact information of the second user.

In an embodiment, a method for resetting a network password of a first user initiated by a second user is disclosed. The method comprises a system receiving a request from the second user to reset the network password of the first user, wherein the request is received by a password internet site hosted on a network that the network password provides access to. In response to receiving this request, verification that the second user is logged onto the network and that the second user has a support relationship to the first user is completed. Based on verifying the support relationship and that the second user is logged into the network, the network password of the first user is reset. A first notification about resetting the network password is sent to a mobile communication device, wherein the mobile communication device is associated with the first user. A second notification is sent via the password internet site to the second user about resetting the network password.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
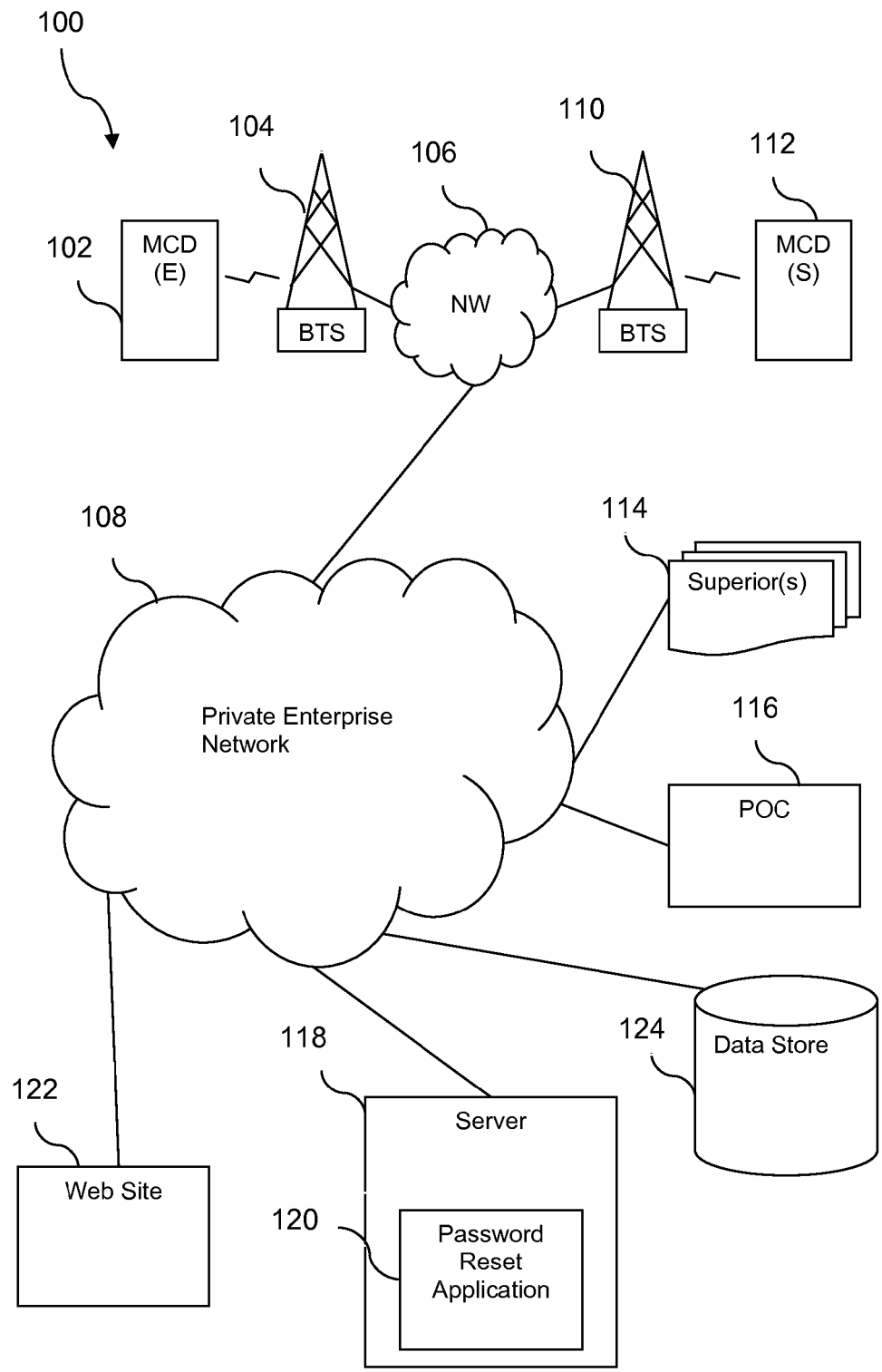
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A method for resetting a network password of a first user initiated by a second user is disclosed. Corporations, organizations, and/or enterprises may have hundreds if not thousands of users. Sometimes users may forget a password for logging in to a computer network or a computer system associated with a particular corporation, organization, or enterprise. This problem may be remedied by having users contact a help desk where users may request that their passwords be reset. This method may be adequate if there are few users that are forgetting their passwords, but when an enterprise has multitudes of users, the number of users that forget their password may be significant. Having many users call into a help desk to have their passwords reset may reduce the productivity because users that cannot log in are not working, and because the workers at the help desk cannot do their other tasks because they are frequently assisting other users reset their passwords.

The present disclosure teaches that to ameliorate this problem, an automated method for resetting a network password of a user may be initiated by a manager, peer manager, supervisor, or technical point of contact (POC) in various ways. One of these ways might include a manager or peer manager sending an email that includes the network identity of the users that request for their passwords to be reset to an automated password reset application executing on a network server. A peer manager might be able to initiate this process because a manager of a user might not always be available to initiate the process. This automated password reset application goes through a series of checks before resetting the password of the user. The application may check that the email is from a valid user (i.e., the email address is attached to a particular domain), that the network identity is that of an active user, that the manager/peer manager is an active and valid user, and that there is a hierarchical chain between the user that requests his or her password reset and the manager/peer manager who is trying to reset the password on the user's behalf. If all of these checks are successful, the application automatically resets the password. After the password is reset, an SMS message containing the new network password is sent to a mobile communication device associated with the user that had his or her password reset. At the same time this first notification may be sent out, the application may look up the contact information of the manager/peer manager in a data store based on an identification of the manager/peer manager contained in the request, and may send out a second notification about resetting the network password to the email address of the manager/peer manager based on the contact information of the manager/peer manager stored in the data store.

Another situation might include employees that work off site from companies as contractors of the corporation who forget their passwords and may have a manager that the corporation does not know. In this case, a point of contact may be used to initiate a password reset process. These points of contacts might include people who may work at care centers/call centers that preside over certain geographical areas of the company. To initiate the password reset process, the contractor may contact his or her point of contact to let them know of his or her problem. The point of contact might then proceed to a password intranet site hosted on a network that the network password provides access to. The website receives the request and goes through a series of checks. It checks to make sure that the point of contact has a support relationship to the contractor that is trying to have their password reset. If this check passes, the password for the contractor may then be automatically reset. After the password is reset, a first notification in the form of a SMS message about resetting the network password and containing the new network password is sent to a mobile communication device, wherein the mobile communication device is associated with the contractor that had their password reset. At the same time, a second notification about resetting the network password for the contractor is sent to the point of contact via the password intranet site.

In some cases, an employee/contractor might know his or her correct password, but may have typed his or her password in incorrectly at a network log-in screen causing the account to be locked. The account lock could be temporary or permanent depending on the security policy applied. To remedy this, managers or points of contacts may be given the ability to unlock a locked network password. This may be accomplished by a manager or point of contact using a password-unlock function provided by the password intranet site which will now be named the website as described above. The manager or point of contact would have the ability to unlock any account for any employees under their jurisdiction.

The method for unlocking an account for an employee/contractor may involve an employee/contractor who contacts their manager or point of contact to let them know that he or she is locked out of his or her account. The manager or point of contact may then send an unlock request which may be received on the website to unlock a locked network password of an employee, wherein the network password of the employee is associated with the network. The website receives the request and goes through a series of checks. The website may verify that the manager or point of contact has a hierarchical/support relationship to the employee. If this check passes, the network password for the employee is automatically unlocked. After the password is unlocked, a notification in the form of an SMS message about unlocking the network password of the employee is sent to a mobile communication device, wherein the mobile communication device is associated with the employee. Another notification about unlocking the password is sent to a communication account of the manager based on the contact information of the manager. This password reset and unlock method may reduce stress on a corporate help desk.

Turning now to FIG. 1, a communication system 100 is described. The communication system 100 comprises a first mobile communication device (MCD) 102, a first base transceiver station (BTS) 104, a second base transceiver station 110, and a second mobile communication device 112. The mobile communication devices 102 and 112 may comprise mobile phones, personal digital assistants (PDA), media players, or other communication enabled portable electronic devices. In an embodiment, the mobile communication devices 102 and 112 may be implemented as handsets. Details of handsets are discussed in more detail hereinafter. The mobile communication devices 102 and 112 may belong to an employee (E) that requests to have his or her password reset or unlocked, or a superior (S) that presides over the employee that requests to have his or her password reset or unlocked, respectively. While this description may refer to an employee, for example an employee requesting his or her password to be reset or unlocked, it is understood that in an embodiment the teachings herein may be applied to computer system users who are not specifically employees. For example, a volunteer of a non-profit organization may have a network or computer system account that is accessed via a user identity and password and likewise may need to have his or her password reset according to the teachings of this disclosure, notwithstanding that he or she is a volunteer and not an employee.

In an embodiment, the employee may be a contractor who works off site from the company. In an embodiment, while this case is described within the terms of an employee and a corporation, a similar process may be used for users that may have network and/or computer system access accounts provided by universities, private enterprises, government organizations, religious organizations, etc. In an embodiment, the base transceiver stations (BTS) 104 and 110 may provide a wireless communication link to the mobile communication devices 102 and 112 respectively, and may link the mobile communication devices 102 and 112 to the network 106. In an embodiment, the base transceiver stations 104 and 110 may provide a wireless communication link to the mobile communication devices 102 and 112 respectively, according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While two base transceiver stations 104 and 110 are illustrated in FIG. 1, it is understood that the communication system 100 may comprise any number of base transceiver stations 104 and 110 and any number of mobile communication devices 102 and 112. The network 106 may be a public communication network, a private communication network, or a combination thereof.

The private enterprise network 108 may comprise a chain of superiors 114 that are logged on to the private enterprise network 108, a point of contact 116 that is logged on to the private enterprise network 108, a private network server 118, a website 122 that is accessed via the intranet of the private enterprise network 108 where passwords may be reset or unlocked, and a data store 124 that contains contact information and relationship statuses between all managers, peer managers, points of contacts, and employees/contractors. In an embodiment, the chain of superiors 114 may either comprise managers or peer managers of employees. In an embodiment, users are not limited to contacting the manager/peer manager directly above them as they may be able to contact the manager above their manager, or the manager above that manager and so on. In an embodiment a password may comprise a series of any combination of uppercase and lowercase letters, numbers, or any other well-known symbols. The length of the password depends upon the policy that is enforced. The server 118 may further comprise an email password application 120 that receives emails from superiors 114 that request to have their employees' passwords reset.

The employee that uses the first mobile communication device 102 may contact his or her superior 114 that uses the second mobile communication device 112, to let him or her know that he or she has forgotten his or her password, and request his or her password to be reset. In an embodiment, the superior 114, in this embodiment a manager, that is logged on to the private enterprise network 108 may send an email to a password reset application 120 that checks for emails from superiors 114 that have employees with passwords to reset. In some contexts the password reset application 120 may be referred to as an email password reset application. The email containing the employee ID of the user with the password to reset may be received by the password reset application 120. The password reset application 120 may go through a series of checks; the password reset application 120 may verify that the superior 114 has a hierarchical relationship to the employee that requests to have his or her password reset which may be found in the data store 124, and that the employee has active status within the corporation A user or user account that has an active status in an intranet or a computer system may be permitted to log into the intranet or computer system. A user or user account may be set to an inactive status after the user leaves the organization, corporation, or enterprise or under other circumstances. The user or user account may not be deleted for a variety of reasons. If these checks pass, the password may then be reset. After the password is reset, a notification with the new password in the form of a SMS message may be sent to the first mobile communication device 102, which is associated with the employee that requested his or her password reset A second notification about the password reset may also be sent to a communication account to the superior 114 that sends the message to the password reset application 120. The communication account of the superior 114 may be found in the data store 124, for example the password reset application 120 may look up an email address of record for the manager. The password reset application 120 sends a notification to the communication account of the superior 114 that it looked up, for example to an email address it looked up, rather than merely replying to a source email address that may have been included in the email requesting the password be reset. This is a security measure that may mitigate the chances that the manager has been spoofed or if the manager has been spoofed to raise a flag by sending the notification email to the email address of record for the manager. If the manager did not in fact send the password reset email request, the manager may then investigate further and take any needed steps to secure the network and/or computer system from a possible security breach. In another embodiment, a superior 114 may be a peer manager who may go through a substantially similar process as described by the latter embodiment, as the manager of an employee may not always be available to go through the process of resetting the password for the employee. The password reset application 120 may refer to the data store 124 to corroborate that the superior 114 is a peer of the manager to the employee that requests his or her password reset.

In an embodiment, the employee that uses the first mobile communication device 102 may send a request to the superior 114, in this embodiment the manager, that uses the second mobile communication device 112 to have his or her password unlocked as opposed to reset as the employee may have mistyped his or her password, but still knows what his or her password is. To resolve this situation, the superior 114 of the employee may visit a website 122 that is accessed via the intranet of the private enterprise network 108 that gives superiors 114 the capability to unlock a password for employees. Before the website 122 unlocks the password for the employee, the website 122 verifies that the superior 114 that sends in the request of the employee has a hierarchical relationship to the employee; this information may be found in the data store 124. If the superior 114 or point of contact 116 has a hierarchical relationship to the employee, for example if the superior 114 is in a superior hierarchical relationship to the employee or user, the password may then be unlocked.

A hierarchal relationship is a relationship involving groups of people within stacked tiers or reporting structures: those within a higher tier preside over those below them and so on. Said in other words, a hierarchical superior of the user or employee may be another user who is in the chain of command or the reporting structure above the user or employee. A peer may be a peer of any hierarchical superior of the user or employee. For example, a user may report to manager A, manager A may report to mid-level manager A, mid-level manager A may report to director A, director A may report to vice-president A. Any of manager A, mid-level manager A, director A, or vice-president may be considered a hierarchical superior of the subject user and authorized to send the email requesting the user's password be reset. A peer who may likewise be authorized to send the email requesting the user's password be reset may include any peer of manager A, any peer of mid-level manager A, any peer of director A, or any peer of vice-president A. In an embodiment, the peers may be restricted to a peer that reports to the same superior as the subject manager, mid-level manager, director, or vice-president. Thus, the peer of mid-level manager A who reports to director A may be authorized to send the email requesting the password to the user to be reset while the peer of mid-level manager A who instead reports to director B may not be authorized to send the email to request the password of the user be reset. In an embodiment, other rules for construing superior hierarchical relations that are authorized to send the email requesting the resetting of the user's password are contemplated and conform with the teachings herein.

In an embodiment, a hierarchical subordinate may be authorized to send the email message requesting the password of the user's superior be reset. A hierarchical subordinate is a user or employee who reports directly or indirectly to the subject user or employee. In an embodiment, if a hierarchical subordinate of a user initiates the password reset for the user, a notification of this action is sent to the communication account of record of that hierarchical subordinate, and a notification of this action is also sent to the communication account of record of the hierarchical superior of the user whose password is reset. In the most general case, a user or employee who has a hierarchical relationship with the user who needs his or her password to be reset may be authorized by the password reset application 120 to initiate the password reset operation. In any given situation, one of skill in the art, in combination with the present disclosure, will be able to tune the rules of what hierarchical relationships will be authorized to initiate a password reset to achieve a suitable balance between convenience and work efficiency versus network and/or computer system security.

When the password is unlocked, a notification about the unlocking of the password may be sent in the form of a SMS message that is received by the mobile communication device 102 that is associated with the employee that requested his or her password unlocked. A second notification about unlocking the password may be sent to communication account of the superior 114 that forwarded the request that the password of the employee be unlocked. The communication account for the superior 114 may be identified in the data store 124.

In an embodiment, an employee that is an off-site contractor for the corporation, that uses mobile communication device 102 and who may not have a superior 114 that the corporation knows about, may contact a point of contact 116 that is logged in the private enterprise network 108 to request that his or her password be reset. Once the point of contact 116 receives the request from the contractor, the point of contact 116 may then visit a website 122 that is accessed via the intranet of the private enterprise network 108 that gives points of contacts 116 the capability to reset passwords for contractors.

The website 122 may receive the request from the point of contact 116, and go through a series of checks: the website 122 may verify that the point of contact 116 is logged onto the private enterprise network 108, and that the point of contact 116 has a support relationship to the employee that requested his or her password to be reset as listed in the data store 124. If these checks are successful, the password is reset. After the password is reset, a notification in the form of a SMS message containing the new password may be sent to the mobile communication device 102 which is associated with the contractor that requested his or her password reset. A second notification about the password unlock may pop up on the website 122 screen as seen by the point of contact 116. In another embodiment, the process for unlocking the password for the contractor is substantially similar to the password reset process as above. The contractor that uses mobile communication device 102 may contact the point of contact 116 that is logged in to the private enterprise network 108 to request to the point of contact 116 to unlock his or her password. The point of contact 116 may then visit the website 122 within the intranet of the private enterprise network 108 which gives points of contacts 116 the capability to unlock passwords for contractors. In some contexts the website 122 may be referred to as a password reset website.

The website 122 receives the request from the point of contact 116, and goes through a series of checks: the website 122 verifies that the point of contact 116 is logged into the private enterprise network 108, and that the point of contact 116 has a support relationship to the contractor that requested his or her password reset. This information of the support relationship may be found in the data store 124. If the checks are successful, the website 122 then unlocks the password for the contractor that requested the password unlocked. After the password is unlocked, a notification about unlocking the password in the form of a SMS message is sent to the mobile communication device 102 which is associated with the contractor. A second notification about the password unlock may pop up on the website 122 screen as seen by the point of contact 116.

Figure 2:
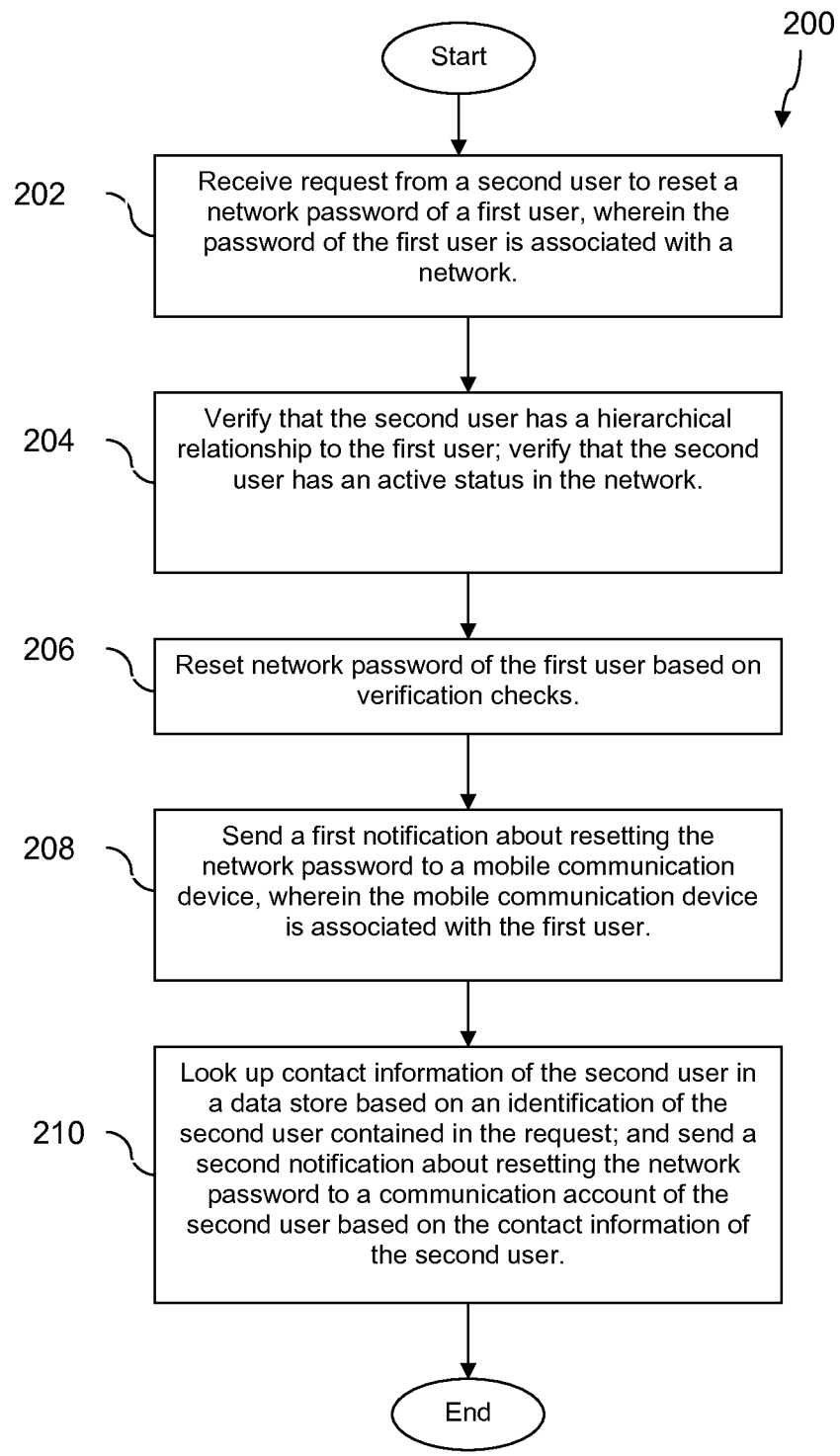
FIG. 2 is a flow chart of a method according to an embodiment of the disclosure.

In FIG. 2 a method 200 is described. At block 202, a request is received from a second user to reset a network password of a first user, wherein the password of the first user is associated with the network. At block 204, the hierarchical relationship between the first user and the second user and the active status in the network of the second user are verified, wherein the network password of the first user is associated with the network. At block 206, the network password of the first user is reset based on the verification checks. At block 208, a first notification about resetting the network password and containing the new network password is sent to a mobile communication device, wherein the mobile communication device is associated with the first user.

At block 210, contact information of the second user is found in a data store based on an identification of the second user contained in the request, wherein a second notification about resetting the network password is sent to a communication account of the second user based on the contact information of the second user. A second notification is sent to a separate account of the second user to ensure that the second user forwarded the request for the password reset of the first user. Said in other words, sending the second notification to a communication account or address of record for the second user rather than replying to the source address of the request may promote detecting a spoofed password reset. That is, if a device pretending (spoofing) the second user requests the password reset, a notification that goes not to the spoofing device but instead to the true second user puts the second user on notice—assuming he or she did not initiate the password reset—that another has been tampering with the password reset process and that a security breach may have occurred. In this instance, the second user may inform network of computer system administrators of the potential security breach, and those administrators may be able to address the situation appropriately.

Figure 3:
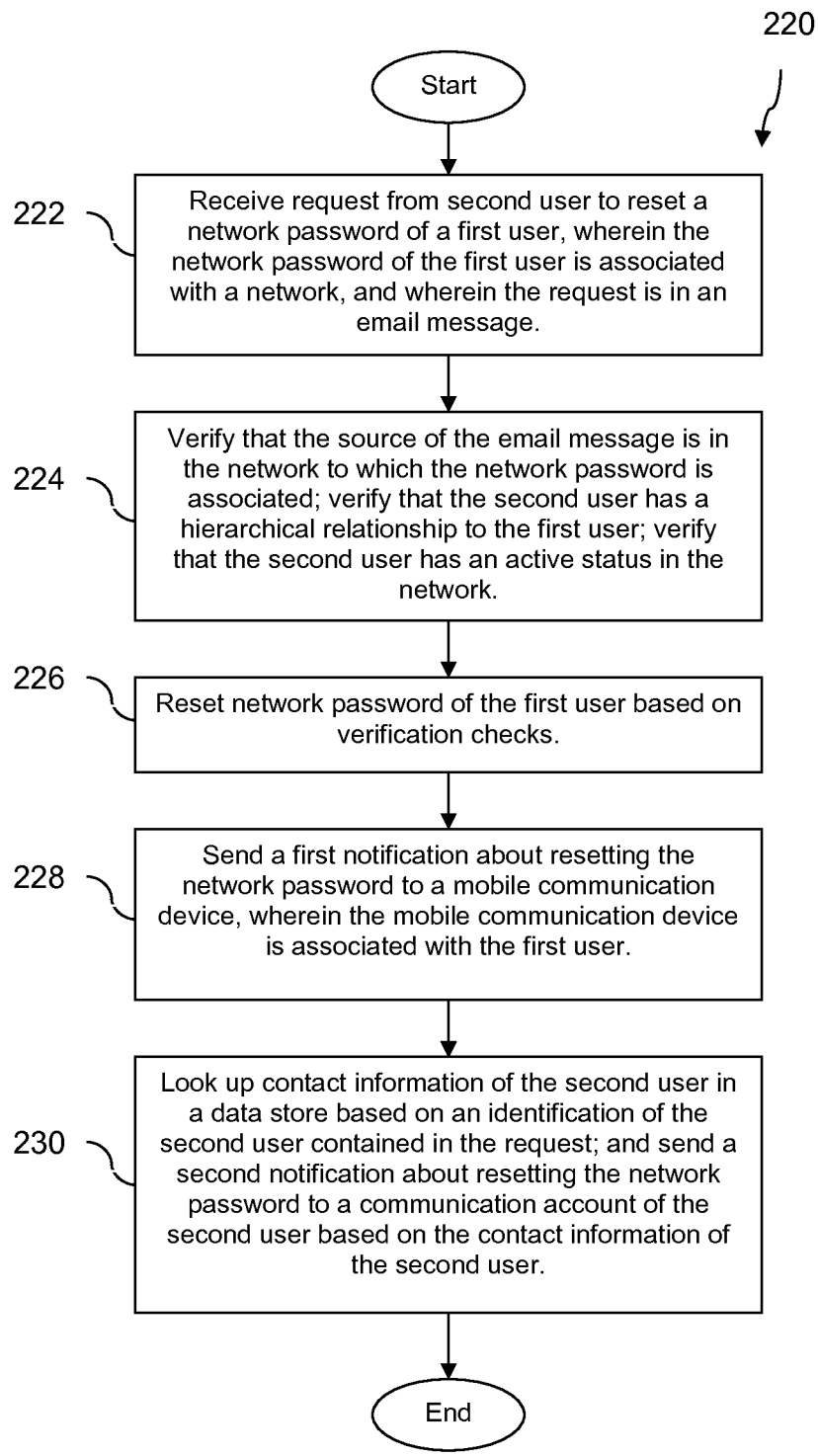
FIG. 3 is a flow chart of a method according to an embodiment of the disclosure.

In FIG. 3, a method 220 is described. At block 222, a request from a second user to reset a network password of a first user is received, wherein the network password of the first user is associated with a network, and wherein the request is in an email message. At block 224, one or more verifications and/or authentications are performed. For example, the email message is verified as originating from the network to which the network password is associated. This may be accomplished by looking at a source address associated with the email message, which may be an address associated with the private enterprise network. Other verifications and/or authentications may involve confirming that the second user has a hierarchical relationship with the first user and/or confirming that the second user has an active status in the network and/or computer system.

At block 226, the network password of the first user is reset based on the verification checks. At block 228, a first notification about resetting the network password and containing the new network password is sent to a mobile communication device, wherein the mobile communication device is associated with the first user. At block 230, contact information of the second user is found in a data store based on an identification of the second user contained in the request, wherein a second notification about resetting the network password is sent is sent to a communication account of the second user based on the contact information of the second user.

Figure 4:
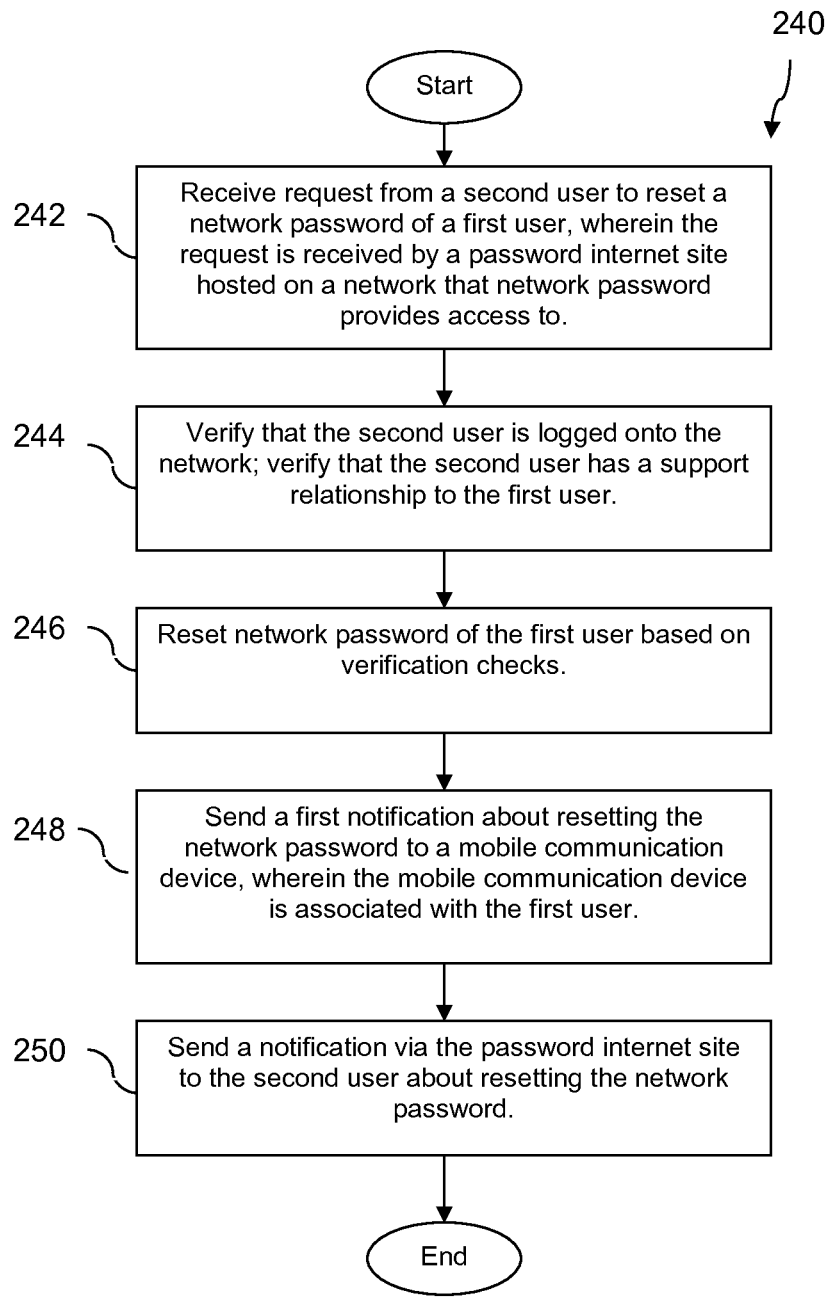
FIG. 4 is a flow chart of a method according to an embodiment of the disclosure.

In FIG. 4 a method 240 is described. At block 242, a request from a second user to reset a network password of a first user is received, wherein the request is received by a password internet site hosted on a network that the network password provides access to. At block 244, the second user is verified as logged onto the network, and that the second user has a support relationship to the first user. This check for being logged on to the network may be omitted in one or more embodiments, because access to the password internet site may imply the subject user is logged in and an explicit check may be redundant. At block 246, the network password of the first user is reset based on the verification checks. At block 248, a first notification about resetting the network password of the first user is sent to a mobile communication device, wherein the mobile communication device is associated with the first user. At block 250, a second notification is sent via the password internet site to the second user about resetting the network password.

Figure 5:
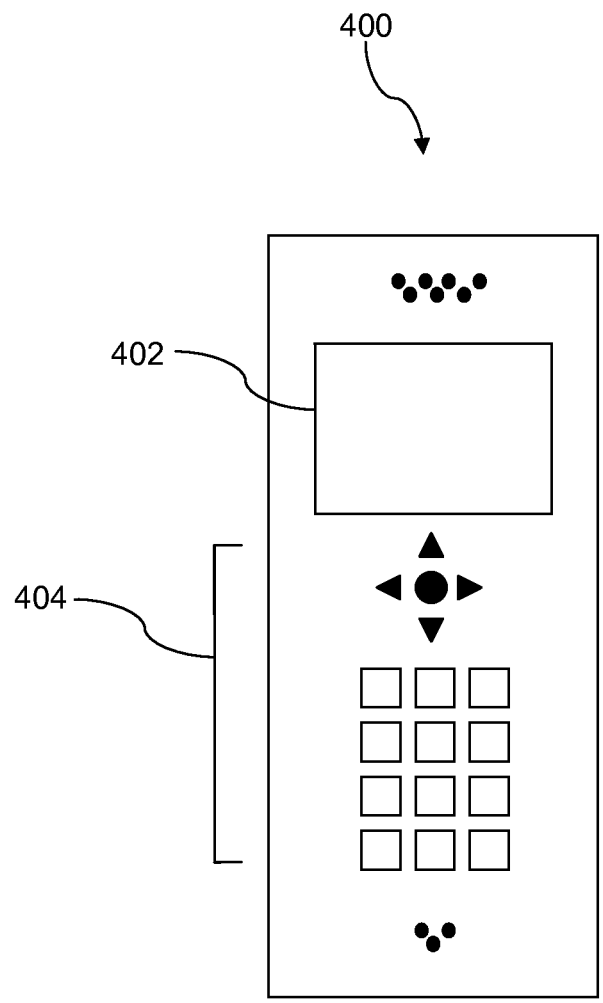
FIG. 5 is an illustration of a mobile communication device according to an embodiment of the disclosure.

FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
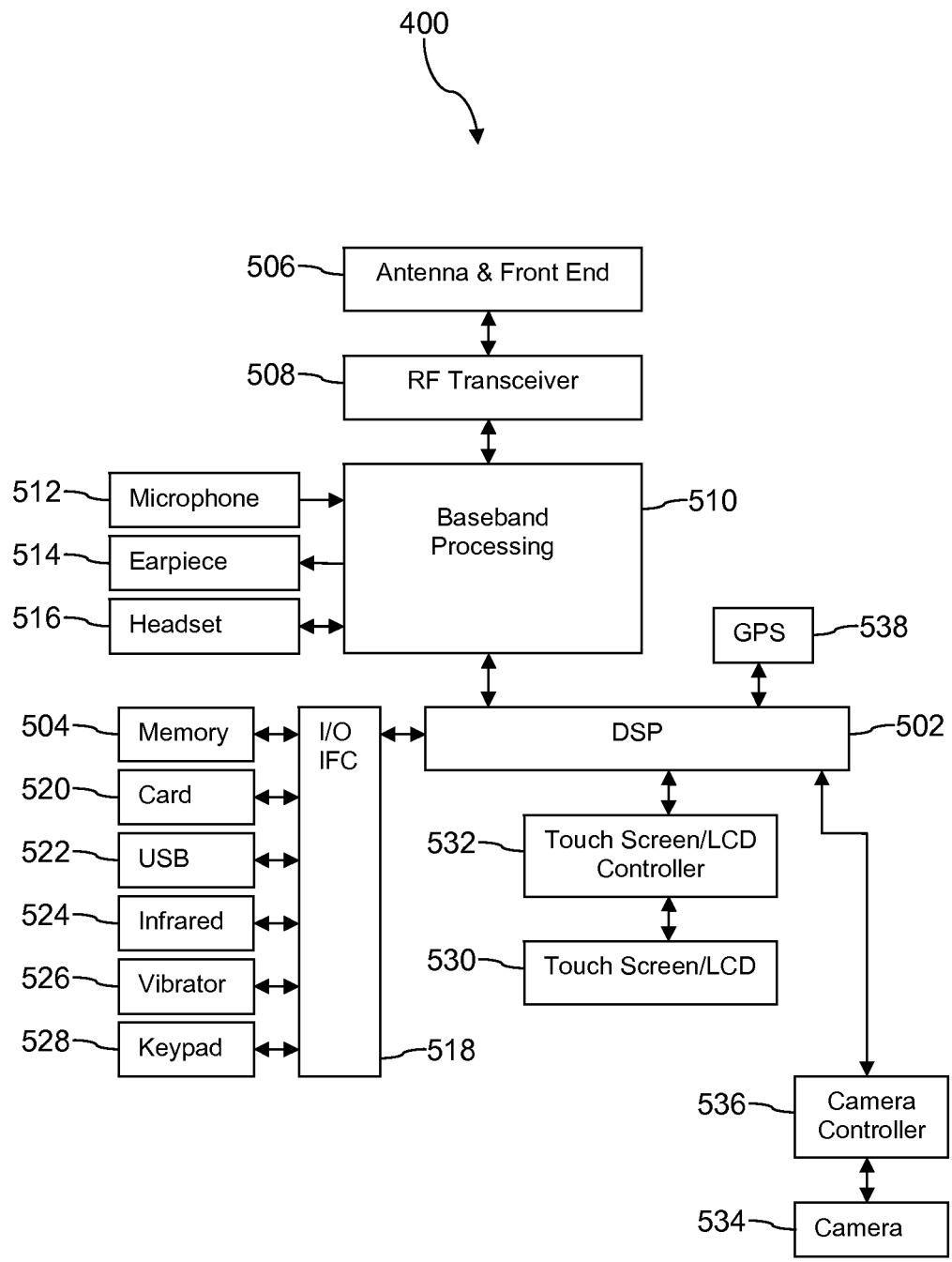
FIG. 6 is a block diagram of a mobile communication device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
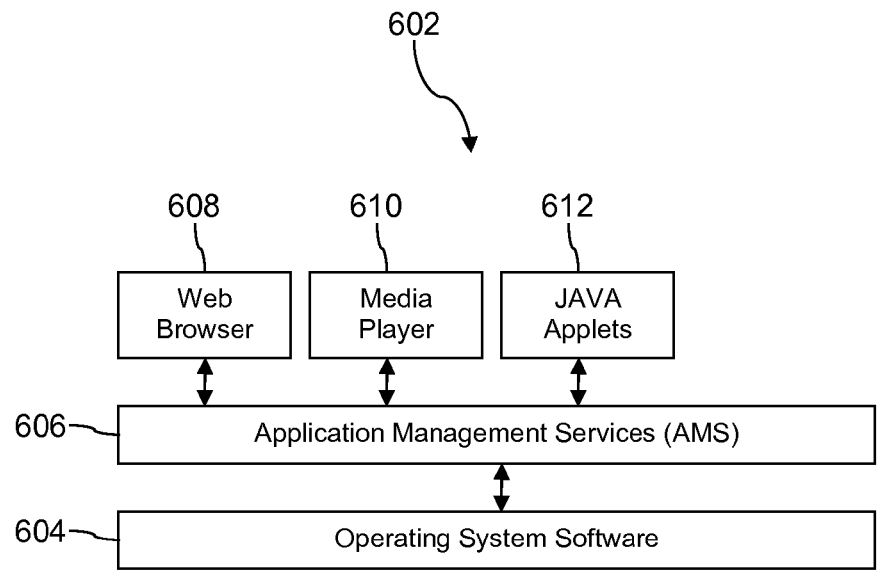
FIGS. 7A and 7B are block diagrams of software architectures for a mobile communication device according to an embodiment of the disclosure

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
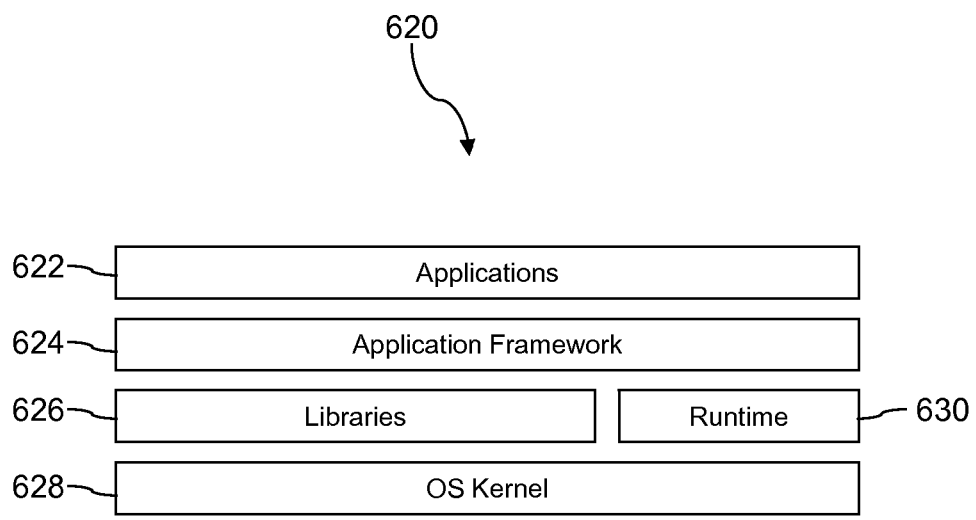

FIG. 7B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
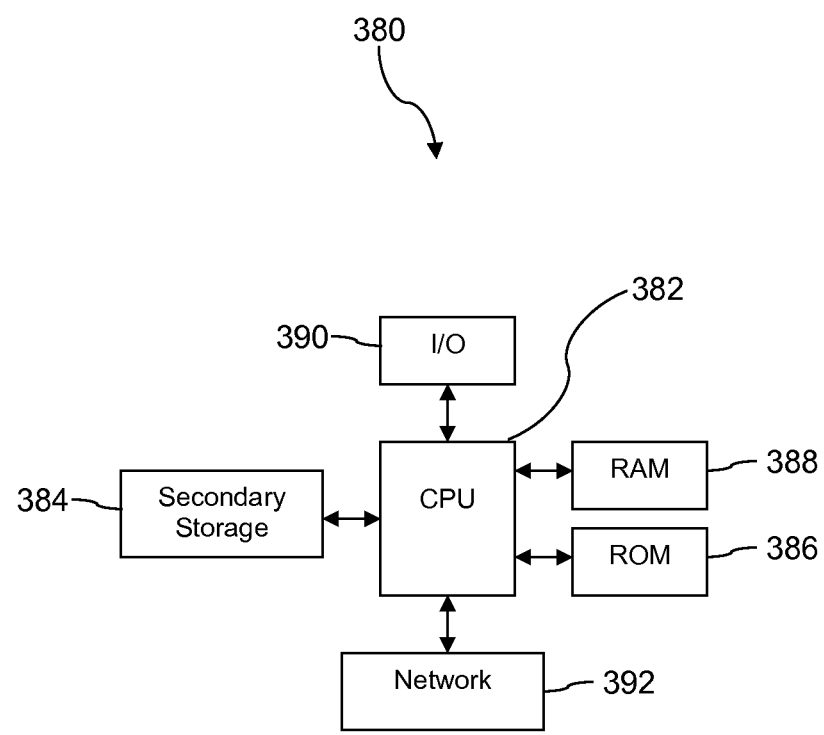
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A method for resetting a network password of a first user initiated by a second user, comprising:
   receiving a request from the second user to reset the network password of the first user, wherein the network password of the first user is associated with a network, and wherein the second user is not a help desk worker;
   in response to receiving the request, accessing a data store that comprises contact information and relationship statuses between users;
   in response to accessing the data store, verifying that there is a hierarchal relationship between the first user and the second user based on a relationship status between the first and second users in the data store, wherein the hierarchical relationship comprises the second user being in a chain of command or reporting structure above the first user;
   verifying that the second user has an active status in the network, wherein the second user with the active status has a valid password and is permitted to access the network via the valid password;
   based on verifying the hierarchical relationship and the active status of the second user, resetting the network password of the first user;
   sending a first notification about resetting the network password to a mobile communication device, wherein the mobile communication device is associated with the first user;
   looking up contact information of the second user in the data store based on an identification of the second user contained in the request; and
   sending a second notification about resetting the network password to a communication account of the second user based on the contact information of the second user.

2. The method of claim 1, further comprising sending a third notification about resetting the network password to a communication account of the first user.

3. The method of claim 1, wherein the first user is not associated with an active status.

4. The method of claim 1, wherein the request from the second user is received by a password reset website hosted on the network or is received in the form of an email message.

5. The method of claim 1, wherein the request comprises a network identity of the first user.

6. The method of claim 5, wherein the network identity of the first user is an active directory (AD) identity.

7. The method of claim 1, further comprising:
receiving an unlock request from the second user to unlock a locked network password of a third user, wherein the network password of the third user is associated with the network;
verifying that the second user has a hierarchical relationship to the third user;
based on verifying the hierarchical relationship of the second user to the third user and the active status of the second user, unlocking the network password of the third user;
sending a fourth notification about unlocking the network password of the third user to a second mobile communication device, wherein the second mobile communication device is associated with the third user; and
sending a fifth notification about unlocking the network password of the third user to the communication account of the second user based on the contact information of the second user.

8. A method for resetting a network password of a first user initiated by a second user, comprising:
receiving an email request message from the second user to reset the network password of the first user, wherein the network password of the first user is associated with a network, and wherein the second user is not a help desk worker;
verifying that the source of the email request message is in the network to which the network password is associated;
in response to receiving the email request message, accessing a data store that comprises contact information and relationship statuses between users;
in response to accessing the data store, verifying that there is a hierarchal relationship between the first user and the second user based on a relationship status between the first and second users in the data store, wherein the hierarchical relationship comprises the second user being in a chain of command or reporting structure above the first user;
verifying that the second user has an active status in the network, wherein the second user with the active status has a valid password and is permitted to access the network via the valid password;
based on verifying the source of the email request message, the hierarchical relationship, and the active status of the second user, resetting the network password of the first user;
sending a first notification about resetting the network password to a mobile communication device, wherein the mobile communication device is associated with the first user;
looking up contact information of the second user in the data store based on an identification of the second user contained in the email request message; and
sending a second notification about resetting the network password to a communication account of the second user based on the contact information of the second user.

9. The method of claim 8, wherein the contact information of the second user is an email address of the second user and wherein the second notification is an email message.

10. The method of claim 8, wherein the hierarchical relationship of the second user to the first user is that the second user is the manager or the supervisor of the first user.

11. The method of claim 8, wherein the hierarchical relationship of the second user to the first user is that the second user is a peer of a manager of the first user.

12. The method of claim 8, wherein the first notification is sent to the mobile communication device as a short message service (SMS) message or a multimedia messaging service (MMS) message.

13. The method of claim 8, wherein the first notification comprises a new network password of the first user.

14. The method of claim 8, further comprising sending a third notification about resetting the network password to a communication account of the first user.

15. A method for resetting a network password of a first user initiated by a second user, comprising:
receiving a request from the second user to reset the network password of the first user, wherein the request is received by a password internet site hosted on a network that the network password provides access to, and wherein the second user is not a help desk worker;
verifying that the second user is associated with an account comprising an active status and is logged into the network, wherein the second user with the account comprising the active status has a valid password and is permitted to access the network via the valid password;
in response to receiving the request, accessing a data store that comprises contact information and relationship statuses between users;
in response to accessing the data store, verifying that the second user has a support relationship to the first user based on a relationship status between the first and second users in the data store, wherein the second user has the support relationship to the first user when the second user is designated as a technical point-of-contact for a plurality of individuals having access to the network including the first user;
based on verifying the support relationship, the active status, and that the second user is logged into the network, resetting the network password of the first user;
sending a first notification about resetting the network password to a mobile communication device, wherein the mobile communication device is associated with the first user; and
sending a notification via the password internet site to the second user about resetting the network password.

16. The method of claim 15, wherein verifying the support relationship comprises matching the first user to the designated technical point-of-contact.

17. The method of claim 15, wherein the support relationship is that the second user is a manager of the first user.

18. The method of claim 15, wherein the support relationship is that the second user is a peer of a manager of the first user.

19. The method of claim 15, wherein the request comprises a network identity of the first user.

20. The method of claim 19, wherein the network identity is an active directory (AD) identity of the first user.

* * * * *